United States Patent
Totten et al.

(10) Patent No.: US 9,760,451 B2
(45) Date of Patent: Sep. 12, 2017

(54) COORDINATED STORAGE OF OPERATING DATA AMONG MULTIPLE VOLTAGE REGULATORS IN RESPONSE TO A FAULT CONDITION

(71) Applicant: Lenovo Enterprise Solutions (Singapore) Pte. Ltd., Singapore (SG)

(72) Inventors: Brian C. Totten, Durham, NC (US); Douglas I. Evans, Cary, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 226 days.

(21) Appl. No.: 14/810,698

(22) Filed: Jul. 28, 2015

(65) Prior Publication Data

US 2017/0031782 A1    Feb. 2, 2017

(51) Int. Cl.
| | |
|---|---|
| *G06F 11/00* | (2006.01) |
| *G06F 11/14* | (2006.01) |
| *G06F 1/26* | (2006.01) |
| *G06F 11/07* | (2006.01) |

(52) U.S. Cl.
CPC .......... *G06F 11/1471* (2013.01); *G06F 1/26* (2013.01); *G06F 11/0736* (2013.01); *G06F 11/0787* (2013.01); *G06F 2201/805* (2013.01)

(58) Field of Classification Search
CPC ..... G06F 1/26; G06F 1/28; G06F 1/30; G06F 11/0736; G06F 11/0787; G06F 11/1471; G05F 1/10; G05F 1/14
See application file for complete search history.

(56) References Cited

U.S. PATENT DOCUMENTS

| | | | | |
|---|---|---|---|---|
| 5,500,806 A | * | 3/1996 | Bellin ................. | G05F 1/14 323/255 |
| 2005/0180065 A1 | * | 8/2005 | Chapuis ................ | G06F 1/26 361/18 |
| 2008/0072080 A1 | * | 3/2008 | Chapuis ................ | G06F 1/26 713/300 |
| 2015/0021987 A1 | * | 1/2015 | Stevens ............... | G06F 1/3209 307/18 |

* cited by examiner

*Primary Examiner* — Michael Maskulinski
(74) *Attorney, Agent, or Firm* — Jeffrey L. Streets

(57) ABSTRACT

A method includes a plurality of voltage regulators distributing power to a plurality of components within a compute node, wherein each of the voltage regulators has a controller, volatile memory and non-volatile memory. The controller of each voltage regulator temporarily caches operating data for the voltage regulator in the volatile memory of the voltage regulator, wherein the controller temporarily caches the operating data collected from the voltage regulator over a sliding time period. When a first voltage regulator from among the plurality of voltage regulators experiences a fault event, the controller of each voltage regulator detects the fault event and automatically copies the cached operating data for the voltage regulator from the volatile memory of the voltage regulator to the non-volatile memory of the voltage regulator in response to detecting the fault event.

20 Claims, 4 Drawing Sheets

COORDINATED STORAGE OF OPERATING DATA AMONG MULTIPLE VOLTAGE REGULATORS IN RESPONSE TO A FAULT CONDITION

BACKGROUND

Field of the Invention

The present invention relates to power distribution including multiple voltage regulators and analysis of available operating data for the voltage regulators following a fault condition.

Background of the Related Art

Any given node of a computer system, such as a server or a network switch, may include multiple voltage regulators in order provide various components with the proper voltage. These voltage regulators may operate in series or parallel, as needed, to distribute power from a power supply to the various components on one or more planar.

Voltage regulators are among the most likely to fail components in a server. A voltage regulator can fail for a variety of reasons, including component defects, wear out mechanisms, acute or prolonged exposure to environmental stressors, and thermal or electrical stress. Unfortunately, it is often very difficult and time-consuming to retroactively determine or reconstruct the causes of voltage regulator failure.

BRIEF SUMMARY

One embodiment of the present invention provides a system comprising a plurality of voltage regulators in a power distribution system within a compute node, wherein each of the voltage regulators includes a controller, volatile memory for temporarily caching operating data for the voltage regulator over a sliding time period, an open drain output that is pulled down to a low voltage in response to a fault event on the voltage regulator, and non-volatile memory for storing a copy of the cached operating data. The system further comprises a common signal line coupled to the open drain output of each of the plurality of voltage regulators so that a fault at any one of the plurality of voltage regulators results in a low voltage on the common signal line that is detectable by each of the other voltage regulators, wherein the non-volatile memory of each voltage regulator stores a copy of the cached operating data stored in the volatile memory of the voltage regulator in response to any of the plurality of voltage regulators experiencing a fault event.

Another embodiment of the present invention provides a method comprising a plurality of voltage regulators distributing power to a plurality of components within a compute node, wherein each of the voltage regulators has a controller, volatile memory and non-volatile memory. The controller of each voltage regulator temporarily caches operating data for the voltage regulator in the volatile memory of the voltage regulator, wherein the controller temporarily caches the operating data collected from the voltage regulator over a sliding time period. When a first voltage regulator from among the plurality of voltage regulators experiences a fault event, the controller of each voltage regulator receives notice of the fault event and automatically copies the cached operating data for the voltage regulator from the volatile memory of the voltage regulator to the non-volatile memory of the voltage regulator in response to receiving notice of the fault event.

DETAILED DESCRIPTION

Figure 1:
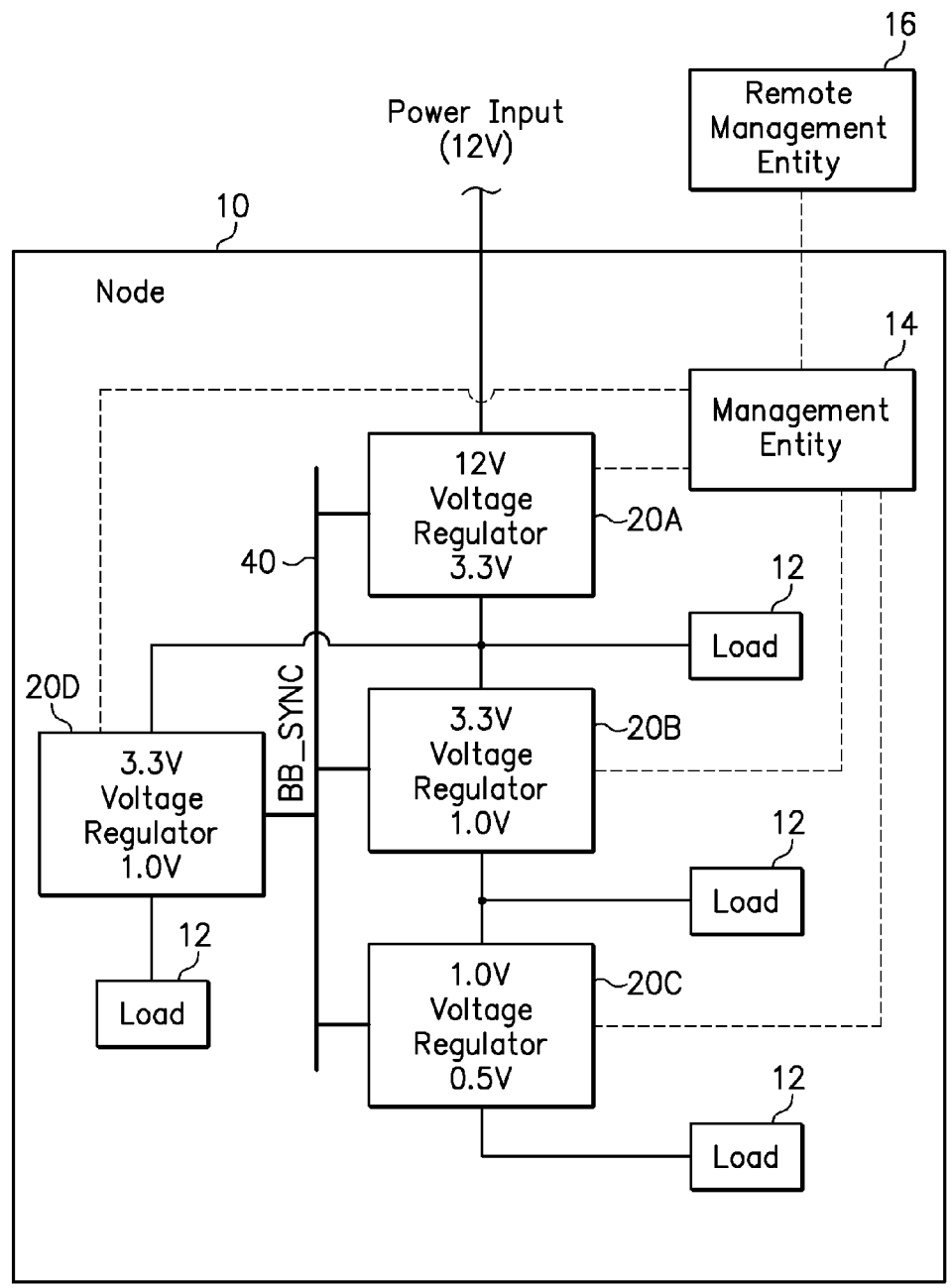
FIG. 1 is a diagram of a node including multiple voltage regulators for distributing power to various components within the node.

One embodiment of the present invention provides a system comprising a plurality of voltage regulators in a power distribution system within a compute node, wherein each of the voltage regulators includes a controller, volatile memory for temporarily caching operating data for the voltage regulator over a sliding time period, an open drain output that is pulled down to a low voltage in response to a fault event on the voltage regulator, and non-volatile memory for storing a copy of the cached operating data. The system further comprises a common signal line coupled to the open drain output of each of the plurality of voltage regulators so that a fault at any one of the plurality of voltage regulators results in a low voltage on the common signal line that is detectable by each of the other voltage regulators, wherein the non-volatile memory of each voltage regulator stores a copy of the cached operating data stored in the volatile memory of the voltage regulator in response to any of the plurality of voltage regulators experiencing a fault event.

In one option, one of the voltage regulators may have a plurality of power stages and each power stage is coupled to the common signal line. In another option, the plurality of voltage regulators may include a first voltage regulator that distributes electrical power upstream of a second voltage regulator, a third voltage regulator downstream from the second voltage regulator, and a fourth voltage regulator in parallel with the second voltage regulator. In yet another option, the system may further comprise a management entity in communication with the controller of each voltage regulator.

Another embodiment of the present invention provides a method comprising a plurality of voltage regulators distributing power to a plurality of components within a compute node, wherein each of the voltage regulators has a controller, volatile memory and non-volatile memory. The controller of each voltage regulator temporarily caches operating data for the voltage regulator in the volatile memory of the voltage regulator, wherein the controller temporarily caches the operating data collected from the voltage regulator over a sliding time period. When a first voltage regulator from among the plurality of voltage regulators experiences a fault event, the controller of each voltage regulator receives notice of the fault event and automatically copies the cached operating data for the voltage regulator from the volatile memory of the voltage regulator to the non-volatile memory of the voltage regulator in response to receiving notice of the fault event.

The cached operating data for each voltage regulator preferably includes operating data collected immediately prior to the fault event. Operating data collected during this time period is the most helpful in determining what caused the fault condition to occur. The operating data may, without limitation, include parameters selected from the group consisting of input voltage, output voltage, input current, output current, and temperature. Still further, the operating data may include parameters selected from fault status, power on hours, power cycle or ON/OFF count, device state, and last known command. The fault event itself may, without limitation, be selected from input over-voltage fault, input under-voltage fault, power good toggle, output over-voltage fault, output under-voltage fault, over-current fault, catastrophic fault, over-temperature fault, software error, firmware error, configuration error, initialization error, and internal voltage fault condition.

The controller of each voltage regulator may monitor the common signal line and receive notice of the fault event in response to a change in voltage on the common signal line. Conversely, any individual controller may control a circuit to pull down the voltage on the common signal line in response to a fault event occurring within the voltage regulator that includes the individual controller.

In a further embodiment of the method, the controller of each voltage regulator may send the operating data stored in non-volatile memory to a management entity within the compute node. For example, the management entity may be a baseboard management controller or an integrated management module. The management entity may analyze the operating data received from the controller of each voltage regulator in order to determine a cause of the fault event. Alternatively, the local management entity may forward the operating data that is received from the controller of each voltage regulator to a remote management entity that receives and analyzes voltage regulator operating data from controllers of a plurality of nodes. The operating data from each voltage regulator in the system during the time period just prior to the fault enables the local or remote management entity to make a more accurate determination of what caused the fault. In this respect, the method may be described as capturing fault-synchronized black box information from a network of voltage regulators when any one of the voltage regulators experiences a fault. Accordingly, the common signal line may be referred to as a black box synchronization (BB_SYNC) line.

The common signal line may be connected to each regulator at both an input and an open drain output. Note, a dual purpose pin is preferred for pin savings on the silicon packaging, however the input/output could be separated into two pins. A regulator could further share this BB_SYNC signal similarly among all of the phases (or power stages) within the regulator, such that all of the power stages capable of failure within a regulator are also networked to the common signal.

In the event of a qualifying fault, such as electrical overstress, the failing voltage regulator would pull down the open drain BB_SYNC signal and simultaneously capture and store its own black box information. Concurrently, the H-L transition of the BB_SYNC signal would be recognized by all of the other voltage regulators in the network. Each voltage regulator would interpret the signal transition as an immediate order to also capture and store its own black box information, regardless of whether a fault has occurred on any of the other voltage regulators. In this way, synchronized telemetry information from all of the voltage regulators in the system with the failing voltage regulator can be captured and stored in nonvolatile memory for subsequent analysis. Having black box information from the working regulators is beneficial for providing a more complete description of events at the time of failure and the information can also be used to corroborate or refute information from the black box of the failing device.

FIG. 1 is a diagram of a node 10 including multiple voltage regulators 20A-D for distributing power to various components or loads 12 within the node. Each voltage regulator 20A-D is included in a power distribution system by virtue of an input connected to a power source and an output connected to a load. The power source may be an external power supply or the output of another voltage regulator within the node. The load may be a power-consuming component of the node, such as a microprocessor or memory module, or an input to another voltage regulator within the node. Each voltage regulator is also coupled to the common signal line 40 (i.e., BB_SYNC) for synchronizing the data capture among the voltage regulators within the node. Still further, each voltage regulator is connected with a management entity 14 in order to send operating data in response to a fault condition within the node. Optionally, the local management entity 14 is in further communication with a remote management entity 16, which may also be in communication with local management entities of other nodes that each have their own common signal line.

The voltage regulators are not limited to any particular configuration within the power distribution system so long as they are connected to the common signal line 40 and are in communication with the management entity 14. Optionally, the voltage regulators could be arranged to have the same input net (i.e., 12V) or a different net. Furthermore, the voltage regulators could all serve to regulate voltages for the same loads or system functions, or different loads and system functions. Still further, the voltage regulators could all be on the same planar or enclosure, or on different planars or enclosures.

In the non-limiting example of FIG. 1, the node 10 includes voltage regulators that are cascaded and voltage regulators that are in parallel. As an example of cascading voltage regulators, a first voltage regulator 20A has an input coupled to an external 12 V power source and a 3.3 V output, a second voltage regulator 20B has an input coupled to the 3.3 V output of the first voltage regulator 20A and a 1.0 V output, and a third voltage regulator 20C has an input coupled to the 1.0 V output of the second voltage regulator 20B and a 0.5 V output. As an example of voltage regulators in parallel, the second voltage regulator 20B has an input coupled to the 3.3 V output of the first voltage regulator 20A, but a fourth voltage regulator 20D also has an input coupled to the 3.3 V output of the first voltage regulator 20A. Optionally, the second and fourth voltage regulators could have different output voltages and still be considered as being in parallel.

Figure 2:
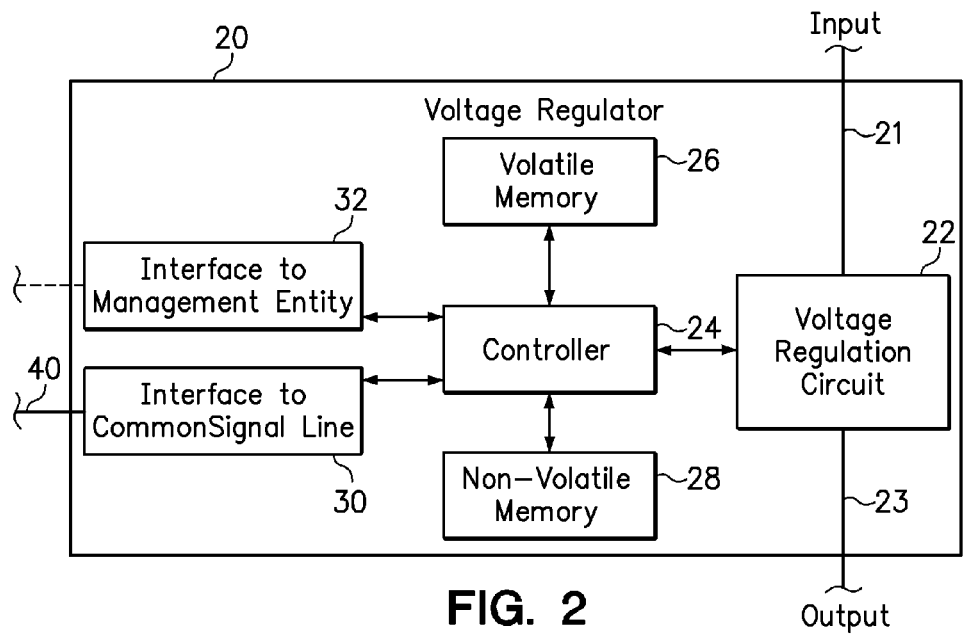
FIG. 2 is a diagram of a voltage regulator.

FIG. 2 is a diagram of a voltage regulator 20, which is representative of any of the voltage regulators 20A-D of FIG. 1. The voltage regulator 20 includes a voltage regulation circuit 22 having an input 21 at a first voltage and an output 23 at a second voltage. A controller 24 monitors the operation of the voltage regulation circuit 22 and stores current operating data in the volatile memory 26. Preferably, the controller 24 manages the volatile memory 26 so that it stores only operating data within a sliding time period or window. For example, current operating data may be stored for only a few seconds before being deleted in a first-in-first-out manner, since the most current operating data at the time of a fault event is the most relevant to determining what caused the fault event. The sliding time period may be a fixed amount of time following collection of the operating data, or may vary, such as may occur by maintaining the operating data in a fixed amount of memory. In response to the controller detecting a fault event in the voltage regulation circuit 22, the controller 24 may store the operating data that is currently in the volatile memory 26 in the non-volatile memory 28. The operating data in the non-volatile memory 28 may be sent to a management entity via an interface 32.

The controller 24 is also in communication with an interface 30 to the common signal line 40. The interface 30 monitors the voltage on common signal line 40 in order to detect a signal indicating a fault on one of the voltage regulators. For example, any one of the voltage regulators may pull down the voltage to cause a high-low voltage transition on the common signal line 40 and providing notice that a fault event has just occurred. In response to detecting such a high-low transition, the controller 24 will automatically store the operating data that is current in the volatile memory 26 in the non-volatile memory 28. The operating data in the non-volatile memory 28 may then be sent to a management entity via an interface 32. In order to pull down the voltage on the common signal line 40, the interface 30 may include a pull down circuit. It should be recognized that each of the other voltage regulators 20 within the node 10 (See FIG. 1) may include "corresponding" or "associated" components, such as a corresponding voltage regulation circuit 22, a corresponding controller 24, a corresponding volatile memory 26, a corresponding non-volatile memory 28, a corresponding interface 32 to the management entity, and a corresponding interface 30 to the common signal line.

Figure 3:
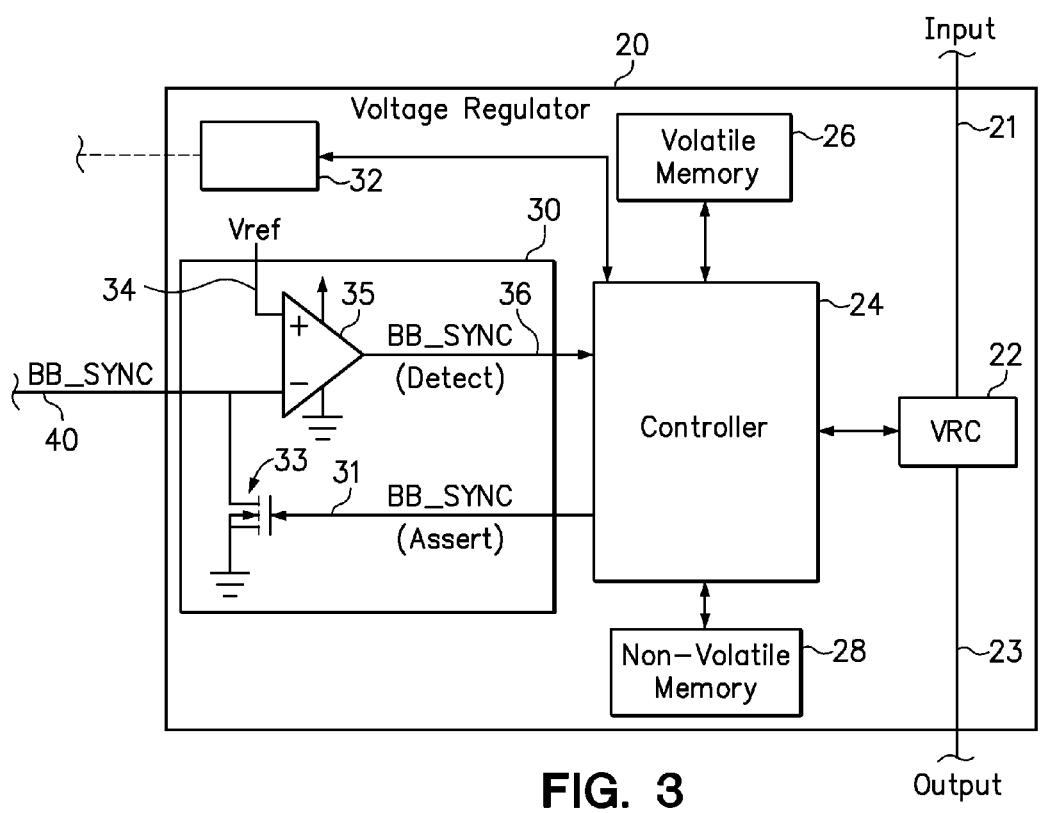
FIG. 3 is a diagram of the voltage regulator of FIG. 2 including one embodiment of an interface to a common signal line.

FIG. 3 is a diagram of the voltage regulator 20 of FIG. 2 including one embodiment of the interface 30 to the common signal line 40 (BB_SYNC). The interface 30 includes both the ability to assert a fault on the common signal line 40 and detect a fault on the common signal line 40. In response to the controller 24 determining that the voltage regulator circuit (VRC) 22 has experienced a fault, the controller 24 will assert a signal 31 to a field-effect transistor (FET) 33 which selectively couples the common signal line 40 to ground. Accordingly, the individual controller 24 can pull down the voltage on the common signal line 40 in response to a fault.

Any of the voltage regulators 20 (see voltage regulators 20A-D in FIG. 1) that are coupled to the common signal line 40 may similarly pull down the common signal line 40 in response to a fault. Therefore, the interface 30 of each voltage regulator 20 should be able to detect when the voltage on the common signal line 40 has been pulled low by any of the voltage regulators 20. In the non-limiting example of FIG. 3, the interface 30 includes an operational amplifier ("op amp" or "comparator") 35 having an inverting input coupled to the common signal line 40 and a non-inverting input coupled to a voltage reference (Vref). Accordingly, the op amp 35 generates an output signal on the signal detection line 36 to the controller 24 in response to the common signal line 40 having a voltage less than the voltage reference. In this manner, the controller 24 of every voltage regulator 20 that is coupled to the common signal line 40 will immediately and simultaneously store operating data from the volatile memory 26 in the non-volatile memory 28.

Figure 4:
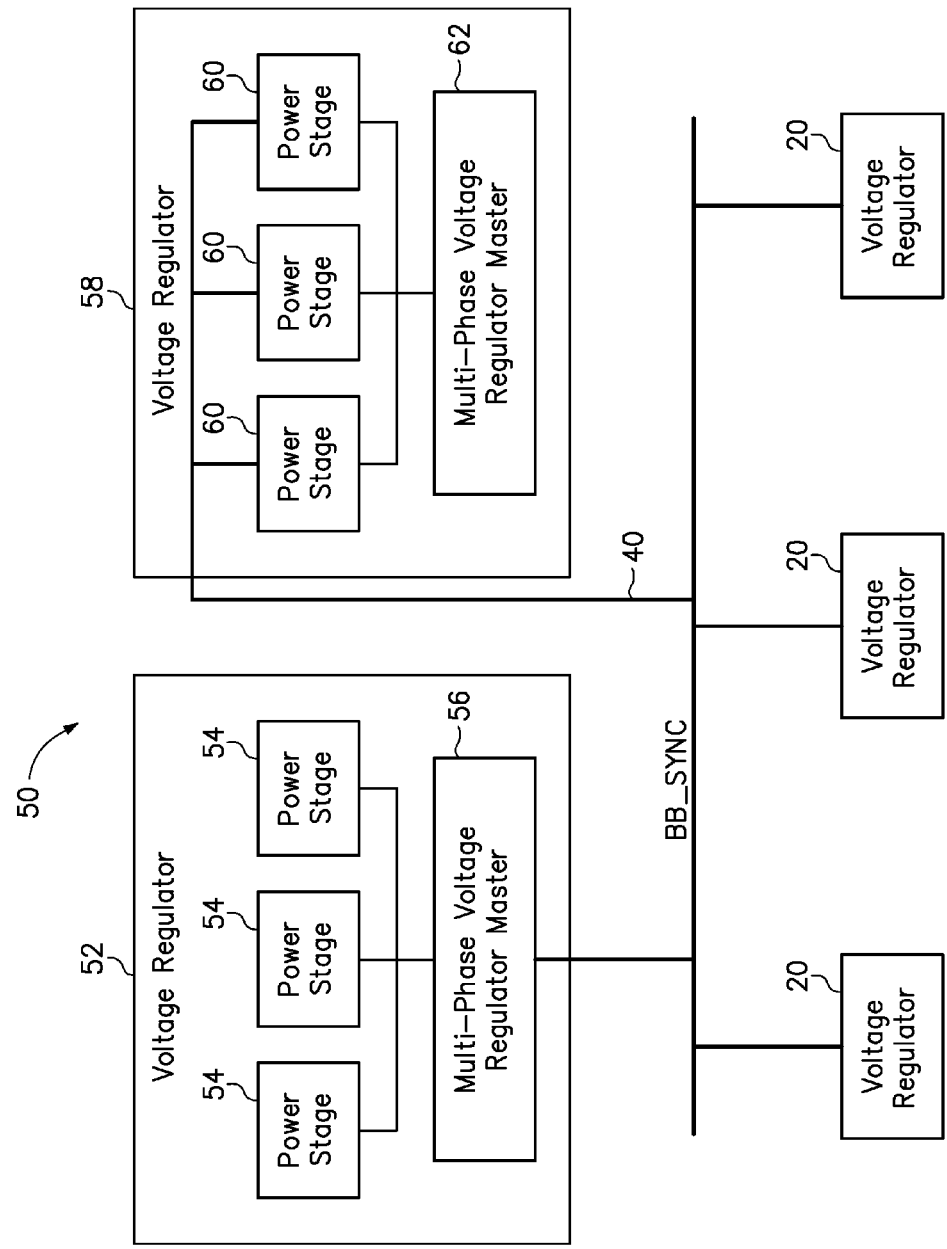
FIG. 4 is a diagram of a hypothetical node having multiple voltage regulators, including a voltage regulator with multiple power stages and a multi-phase voltage regulator master controller.

FIG. 4 is a diagram of multiple voltage regulators in a hypothetical node 50, including various single stage voltage regulators 20. The node also includes a first multi-stage voltage regulator 52 with multiple power stages 54 and a multi-phase voltage regulator master controller 56 that monitors the power stages 54 and is coupled to the common signal line 40 (BB_SYNC). The first multi-stage voltage regulator 52 may operate in the same manner as the voltage regulator 20 in FIG. 2, except that the controller monitors multiple power stages rather than a single power stage (i.e., the voltage regulation circuit 22 of FIG. 2). The node also includes a second multi-stage voltage regulator 58 having multiple power stages 60 that are independently coupled to the common signal line 40 (BB_SYNC) and a multi-phase voltage regulator master controller 62 that monitors the power stages 60. While the multi-phase voltage regulator master controller 62 monitors and controls certain aspects of the operation of the power stages 60, each power stage 60 may also include its own decentralized controller and interface to the common signal line 40 (BB_SYNC) consistent with FIG. 2 and FIG. 3.

Figure 5:
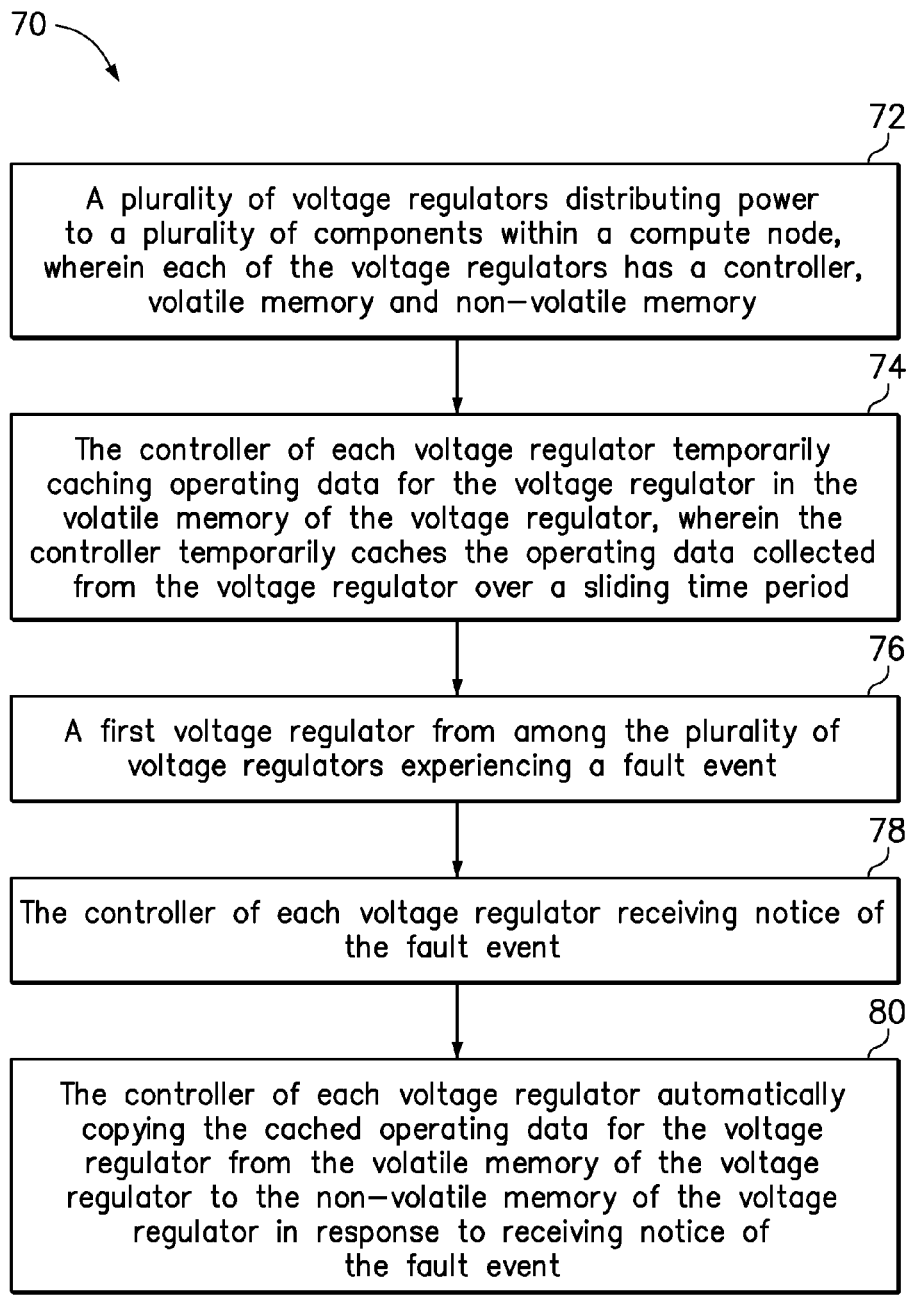
FIG. 5 is a flowchart of a method according to one embodiment of the present invention.

FIG. 5 is a flowchart of a method 70 according to one embodiment of the present invention. In step 72, the method includes a plurality of voltage regulators distributing power to a plurality of components within a compute node, wherein each of the voltage regulators has a controller, volatile memory and non-volatile memory. In step 74, the method includes the controller of each voltage regulator temporarily caching operating data for the voltage regulator in the volatile memory of the voltage regulator, wherein the controller temporarily caches the operating data collected from the voltage regulator over a sliding time period. Then, the method includes a first voltage regulator from among the plurality of voltage regulators experiencing a fault event in step 76 and the controller of each voltage regulator detecting the fault event in step 78. In step 80, the method includes the controller of each voltage regulator automatically copying the cached operating data for the voltage regulator from the volatile memory of the voltage regulator to the non-volatile memory of the voltage regulator in response to detecting the fault event.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
a plurality of voltage regulators distributing power to a plurality of components within a compute node, wherein each of the voltage regulators has a controller, a volatile memory and non-volatile memory;
the controller of each voltage regulator temporarily caching operating data for the voltage regulator in the volatile memory of the voltage regulator, wherein the controller temporarily caches the operating data collected from the voltage regulator over a sliding time period;

a first voltage regulator from among the plurality of voltage regulators experiencing a fault event;

the controller of each voltage regulator receiving notice of the fault event; and the controller of each voltage regulator automatically copying the cached operating data for the voltage regulator from the volatile memory of the voltage regulator to the non-volatile memory of the voltage regulator in response to receiving notice of the fault event.

2. The method of claim 1, wherein the cached operating data for each voltage regulator includes operating data collected immediately prior to the fault event.

3. The method of claim 1, wherein the plurality of voltage regulators each have an open drain output, and wherein the open drain output of each voltage regulator is coupled together by a common signal line.

4. The method of claim 3, wherein one of the voltage regulators has a plurality of power stages and each power stage is coupled to the common signal line.

5. The method of claim 3, further comprising:

the controller of each voltage regulator monitoring the common signal line, wherein the controller of each voltage regulator receives notice of the fault event in response to a change in voltage on the common signal line.

6. The method of claim 5, wherein the first voltage regulator pulls down the voltage on the common signal line.

7. The method of claim 1, wherein the plurality of voltage regulators includes a voltage regulator that distributes electrical power upstream of the first voltage regulator, a voltage regulator downstream from the first voltage regulator, and a voltage regulator in parallel with the first voltage regulator.

8. The method of claim 1, wherein the operating data includes parameters selected from the group consisting of input voltage, output voltage, input current, output current, and temperature.

9. The method of claim 1, wherein the operating data includes parameters selected from fault status, power on hours, power cycle or ON/OFF count, device state, and last known command.

10. The method of claim 1, wherein the fault event is selected from input over-voltage fault, input under-voltage fault, power good toggle, output over-voltage fault, output under-voltage fault, over-current fault, catastrophic fault, over-temperature fault, software error, firmware error, configuration error, initialization error, and internal voltage fault condition.

11. The method of claim 1, further comprising:

the controller of each voltage regulator sending the operating data stored in non-volatile memory to a management entity within the compute node.

12. The method of claim 11, further comprising:

the management entity analyzing the operating data received from the controller of each voltage regulator to determine a cause of the fault event.

13. The method of claim 11, wherein the management entity is selected from a baseboard management controller and an integrated management module.

14. The method of claim 13, further comprising:

the management entity forwarding the operating data that is received from the controller of each voltage regulator to a remote management entity.

15. The method of claim 14, further comprising:

the remote management entity receiving voltage regulator operating data from controllers of a plurality of compute nodes.

16. The method of claim 1, wherein the compute node is selected from a server and a network switch.

17. A system, comprising:

a plurality of voltage regulators in a power distribution system within a compute node, wherein each of the voltage regulators has a controller, volatile memory for temporarily caching operating data for the voltage regulator over a sliding time period, an open drain output that is pulled down to a low voltage in response to a fault event on the voltage regulator, and non-volatile memory for storing a copy of the cached operating data; and a common signal line coupled to the open drain output of each of the plurality of voltage regulators so that a fault at any one of the plurality of voltage regulators results in a low voltage on the common signal line that is detectable by each of the other voltage regulators, wherein the non-volatile memory of each voltage regulator stores a copy of the cached operating data stored in the volatile memory of the voltage regulator in response to any of the plurality of voltage regulators experiencing a fault event.

18. The system of claim 17, wherein one of the voltage regulators has a plurality of power stages and each power stage is coupled to the common signal line.

19. The system of claim 17, wherein the plurality of voltage regulators includes a first voltage regulator that distributes electrical power upstream of a second voltage regulator, a third voltage regulator downstream from the second voltage regulator, and a fourth voltage regulator in parallel with the second voltage regulator.

20. The system of claim 17, further comprising:

a management entity in communication with the controller of each voltage regulator.

* * * * *